April 9, 1929.　　　　　J. H. KOLTS　　　　　1,708,508
THERMOSTATIC VALVE MECHANISM
Filed July 8, 1925　　　3 Sheets-Sheet 1
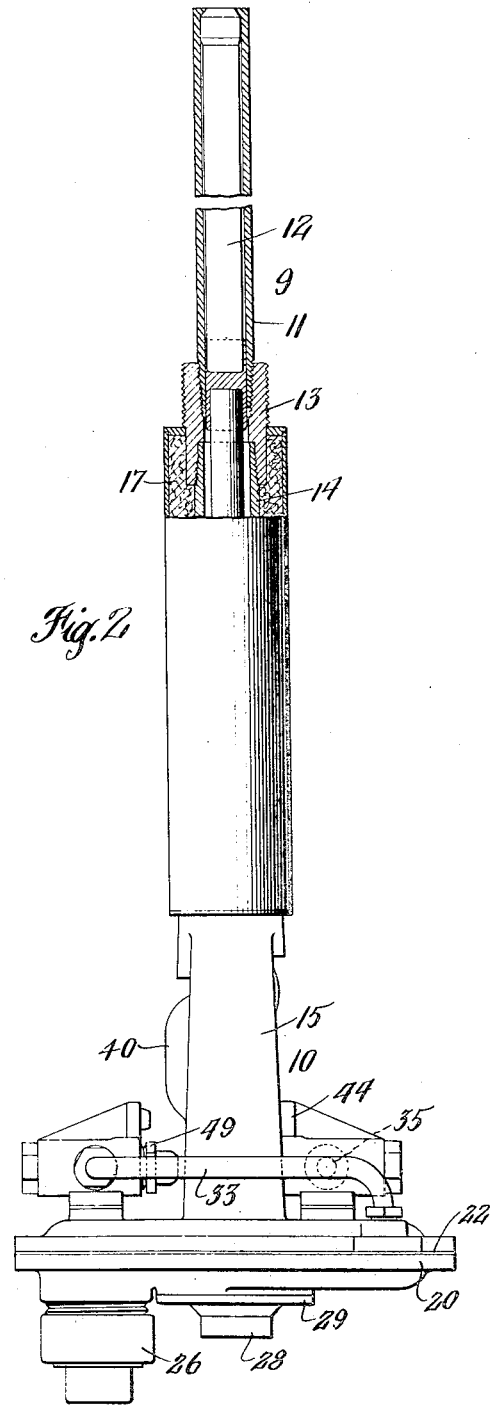
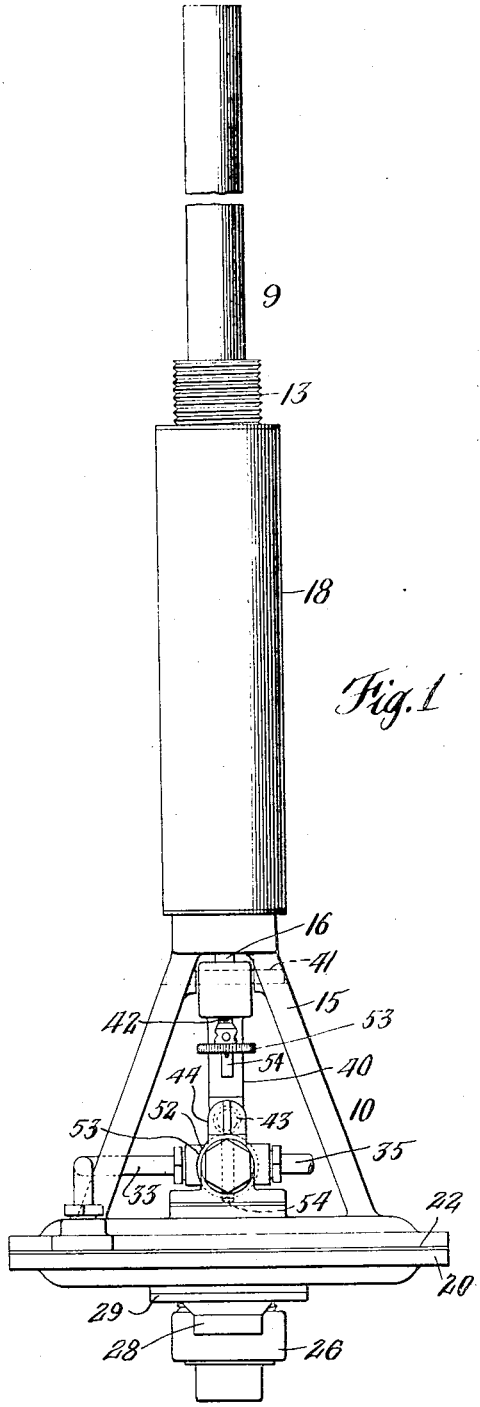
INVENTOR
John H. Kolts
BY Synnestvedt & Lechner
ATTORNEYS

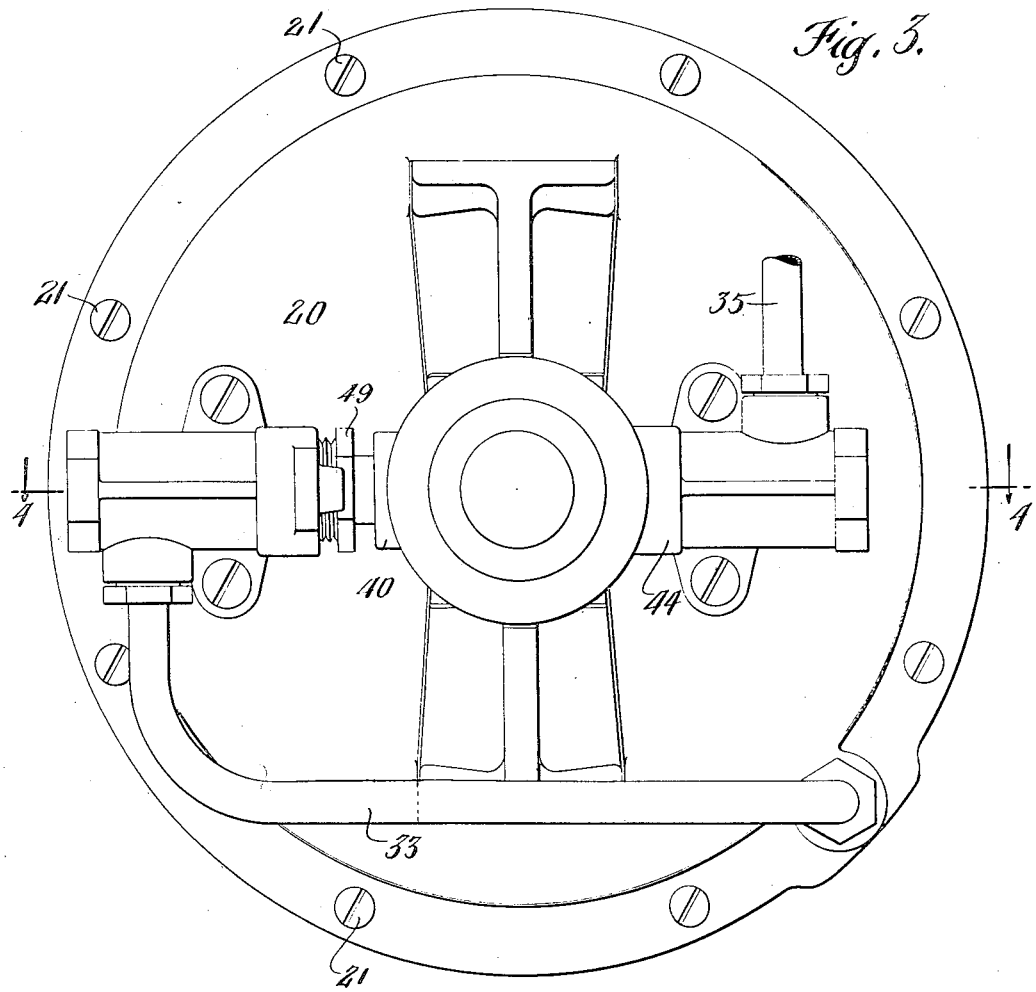

April 9, 1929.　　　J. H. KOLTS　　　1,708,508
THERMOSTATIC VALVE MECHANISM
Filed July 8, 1925　　　3 Sheets-Sheet 3

INVENTOR
John H. Kolts
BY
Symestwedt & Lechner
ATTORNEYS

Patented Apr. 9, 1929.

1,708,508

UNITED STATES PATENT OFFICE.

JOHN H. KOLTS, OF CRAFTON, PENNSYLVANIA, ASSIGNOR TO PITTSBURG WATER HEATER COMPANY, A CORPORATION OF NEW JERSEY.

THERMOSTATIC VALVE MECHANISM.

Application filed July 8, 1925. Serial No. 42,157.

My invention relates to thermostatic and valve mechanism, and is particularly advantageous for controlling the supply of fuel gas to hot water heaters and the like. I aim to improve the construction and operation of such devices in various ways; particularly, to provide for turning the gas off when the water has attained one temperature, and for turning it on again at a substantially different temperature, and for varying this temperature range; to improve the seating action of a diaphragm valve such as is preferably used for controlling the gas supply of a water heater; and to improve control valve such as may be used to control the action of the diaphragm valve.

How these and other objects and advantages can be realized through my invention will appear from my description hereinafter of a selected and preferred embodiment. In the present instance, I have illustrated this embodiment of the invention as applied to a snap valve mechanism such as shown in my U. S. Patent No. 1,480,765, granted January 15, 1924.

In the drawings, Figs. 1 and 2 are side views of an apparatus conveniently embodying my invention, at right angles to one another.

Fig. 3 is a plan view, on a larger scale than Figs. 1 and 2.

Figure 4:
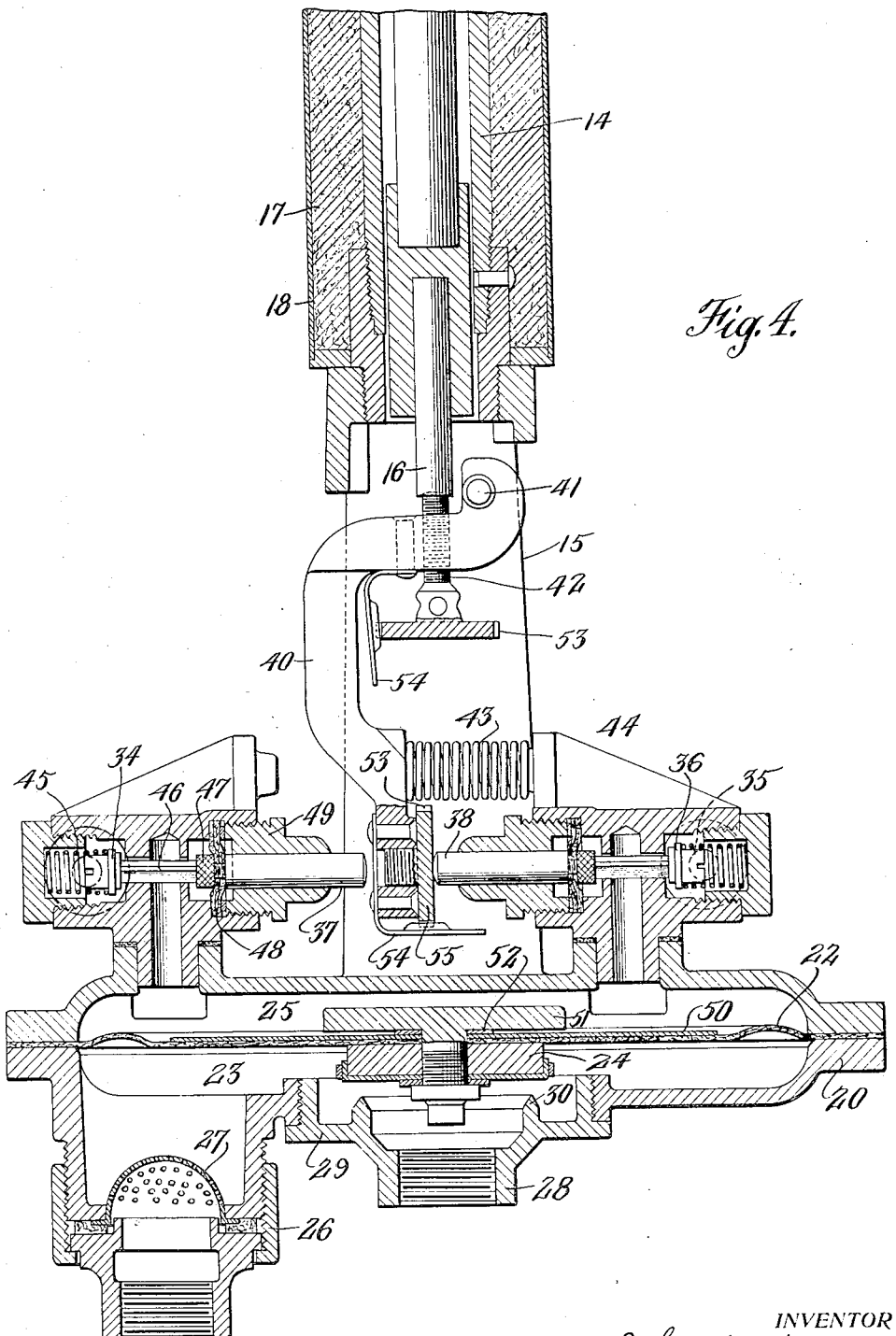
Fig. 4 shows a vertical mid-section through the lower portion of the apparatus, taken as indicated by the line 4—4 in Fig. 3.

Referring to Figs. 1—4, it will be seen that the apparatus shown comprises a thermostat 9 adapted to be mounted in the waterspace of a hot water tank or the like, so as to be externally exposed and responsive to the temperature of the water, and a snap valve mechanism 10 attached to the thermostat 9 for actuation thereby. In the present instance, the thermostat 9 comprises an outer tube 11 of highly thermo-expansive metal (e. g. copper), and an inner rod 12 of less expansive metal. These are fixedly secured together at their inner ends, watertight. The outer end of the tube 11 is secured in an externally screw threaded plug 13 adapted to be screwed into a hole in a wall of the hot water storage tank or the like with which the device is associated. In the present instance, a tubular extension 14 downward from the plug 13 connects it to the frame 15 of the snap valve mechanism 10, and an extension 16 of the rod 12 down through the member 14 serves to actuate the mechanism 10. The parts 14 and 16 are preferably of the same metal, so that temperature changes to which they may be subject (e. g., if they extend through the fire space of a hot water heater) shall not affect the action of the thermostat 9. As shown, this extension 14, 16 of the thermostat 9 is protected by thermo-insulative packing 17 in a tubular metal casing 18.

The snap valve mechanism 11 (see especially Figs. 3 and 4) comprises a diaphragm chamber or casing 20 in upper and lower halves, the upper attached to the frame 15 and the lower secured to the upper by screws 21, with a diaphragm 22 of impervious flexible material clamped gas-tight between. The diaphragm 22 divides the casing 20 into a lower compartment 23, thru which gas flows under control of a disc-like valve 24 carried by the diaphragm, and an upper compartment 25 to which gas is admitted and whence it is exhausted to operate the valve 24. Gas enters the lower compartment 23 thru an inlet connection 26 provided with a dome strainer 27, and leaves thru a central outlet 28 directly opposite the valve 24. The outlet 28 is in a plug 29 screwed into an opening in the lower casing half, an annular ridge 30 being formed on said plug to constitute a valve seat. To close the valve 24, gas from the lower chamber 23 is admitted to the upper chamber 25 through a pipe connection 33 controlled by an admission valve 34; to open the valve 24, the gas is exhausted from the upper chamber 25 (after closure of the admission valve 34) through a relief connection 35, controlled by a valve 36. These valves 34, 36 are arranged with their actuating stems 37, 38 opposite one another, and are actuated by the thermostat rod extension 16 thru connections including an angular lever 40 fulcrumed on the frame 15 at 41, with its free end between the stems 37, 38. A screw 42 through the lever 40 engages the lower end of the rod 16 and serves as an adjustable connection between them, and a helical compression spring 43 acts between the lever 40 and a bracket abutment 44 on one of the control valve casings to urge the lever to the left and upward, so as to keep the screw 42 always against the rod 16.

As shown in Fig. 4, the control valves 34, 36 are counterparts of one another, so that the description of the valve 34 will serve for both. It is of poppet type and is urged to seat and close by a helical compression spring 45. It has an extension 46 (through its port) which engages endwise against a nut 47 that serves to clamp a flexible diaphragm 48 centrally to the end of the actuating rod 37. The margin of the diaphragm 48 is tightly clamped between a shoulder in the valve casing and a screw plug 49, through which the stem 37 extends. The flexible diaphragm 48 forms a fluid-tight mounting for the rod 37, but readily yields to permit it to move endwise to operate the valve 34.

As thus far explained, the mechanism and its operation so far resemble those described in my above-mentioned Patent No. 1,480,765 as to require no further general description. I will now proceed, however, to describe various other features of the mechanism, with which my present invention is more especially concerned.

At the upper side of the flexible diaphragm 22 (Fig. 4), there is a thin sheet metal disc 50, secured by the bolt 51 that extends through the diaphragm 22 and the valve 24 and clamps them together. While large, this disc 50 leaves a substantial margin of the disc 22 uncovered and free for upward and downward flexure as required for opening and closing of the valve 24. As shown in Fig. 4, the head of the bolt 51 is of exaggerated size, corresponding approximately to (or exceeding) the valve 24, and considerably overlaps a washer 52 (of ordinary proportion) interposed between it and the disc. This construction affords various advantages: more especially, it reduces liability of failure of the diaphragm 22 as a result of local weakness, and gives a better "snap" action, with less liability for the valve 24 to tilt or move up and down unequally at opposite sides of its center. The broad bolt head 51 serves to sustain the disc 50 against excessive flexure or buckling upward near its periphery.

The plate 50 also increases the effective lifting power on the diaphragm 22, owing to the fact that only the pressure on the area of the diaphragm within the center of the buckling zone is really effective to lift. With the plate 50, this area extends to the middle of buckled zone shown outside the circumference of the plate; without this plate 50, such area would only extend out about midway between the circumference of the diaphragm chamber and that of the central structure. The greater lifting area allows more weight on the valve 24, thus giving a more positive seating.

As shown in Fig. 4, the screw 42 has a large head with peripheral engagement means, such as milling or notching 53, for engaging a locking device, such as a leaf-spring catch or detent 54 with its upper end fastened to the lever 40. Besides this adjustment of the operating connection between the lever 40 and the thermostat member 16, provision is shown for adjusting the operating connection of the lever to one, at least, of the control valves 34, 36, by what amounts to varying the effective thickness of the lever portion that engages the valve stems 37, 38. For this purpose, a large-headed screw 55 (somewhat similar to the screw 42) is threaded in the end of the lever 40; it is similarly notched at 53, and provided with a similar spring detent 54.

By adjusting the screw 42, the movement and action of the lever 40, as a whole, can be adjusted, and the temperature at which it acts on both valves 34, 36 thus varied. By adjusting the screw 55, on the other hand, the action of the lever 40 on the valve 36 can be adjusted and varied independently of (or relative to) its action on the valve 34. In this way, the temperature interval between the operation of one control valve and that of the other can be varied, and hence the temperature interval between the turning on and off of the gas by opening and closing of the main valve 24 can be regulated and controlled.

To make this clear, it is only necessary to consider the action of the valve mechanism a little. When the chamber 25 is full of gas, the valve 34 open and the valves 24 and 36 closed, and the lever 40 swinging to the right as the thermostat 9 contracts as a result of cooling or drawing off of the hot water, the valve will not snap open merely on closure of the admission valve 34, by the lever 40; because the only effect of this is to imprison a body of gas in the chamber 25 at the same pressure as that in the chamber 23. To open the valve 24, therefore, it is necessary also to open the relief valve 36 and vent the chamber 25, thus reducing the pressure above the diaphragm 22 and allowing that beneath it to lift the valve 24. Similarly, when the valves 36 and 24 are open and the valve 34 closed, and the lever 40 is swinging to the left as the increasing heat of the water expands the thermostat 9, then the valve 24 will not snap shut merely on closure of the relief valve 36: on the contrary, it is necessary also to open the admission valve 34 and thus equalize the pressures above and below the diaphragm 22. In other words, the lever 40 must move (and the temperature vary) thru the interval between the position at which the one control valve closes and and that at which the other opens in order to close the valve 24 after it has opened or to open it after it has closed. This interval is determined by the adjustment of the screw 55; while the temperature at which the valve 34 opens or closes is determined by the adjustment of the screw 42.

The bores for valve actuating stems 37, 38 in the parts 49, 49 are preferably a close fit but not tight, and their bearing very extended,—instead of their being so loose as not to amount to a fit and the plugs being of very short extent along the stems, as in my prior patent. The fit should not, however, be so close as to prevent easy movement of the stems. The guidance thus afforded the stems 37, 38 prevents them from tilting and thus causing wear of the diaphragm 48,—thus prolonging the life and tightness of the latter.

By preventing lateral tilting or cocking of the stems 37, 38, the extended guidance afforded by the parts 49, 49 prevents irregular variations of the points of engagement of these stems with the lever 40, which might otherwise affect the accuracy of adjustment somewhat, if the engaging faces of the parts 54 and 55 should not be exactly true.

I claim:

1. The combination of a thermostat and pressure operated mechanism having admission and relief valves arranged with their actuating stems in alinement, with an actuating connection from said thermostat to said valves including a member between the valve stems adjustable in effective thickness to vary the temperature interval between the operation of one valve and the corresponding operation of the other.

2. The combination of a thermostat and pressure operated mechanism having admission and relief valves arranged with their actuating stems in alinement, with an actuating connection from said thermostat to said valves including a member located between the valve stems adapted to engage one of them, and a screw adjustable in said member for engaging the other.

3. The combination of a thermostat and pressure operated mechanism having admission and relief valves for controlling the action of the operating medium, with actuating connections from said thermostat to said valves comprising a lever provided with independent screws for actuation by the thermostat and for actuating one of said valves respectively.

4. In combination, a thermostat, a pressure operated mechanism provided with admission and relief valves for controlling the action of the operating medium, valve stems projecting from said valves, a member associated with said thermostat and arranged for operative engagement with one or the other of said valve stems, and means for adjusting the effective stroke of said member whereby to vary the temperature interval between the operation of one valve and that of the other.

5. In combination, a thermostat, a pressure operated mechanism provided with admission and relief valves for controlling the action of the operating medium, valve stems freely projecting from said valves in spaced axial alinement with one another, a member operatively associated with said thermostat and having a portion thereof depending in the space between the free ends of said stems, and means for varying the effective thickness of said depending portion.

6. The combination of a thermostat and pressure operated mechanism having admission and relief valves, with a valve actuating member associated with said thermostat and valve operating stems extending from said valves toward different sides of said member for operative engagement thereby, together with means for varying the effective thickness of the stem engaging portion of said member.

In testimony whereof, I have hereunto signed my name.

JOHN H. KOLTS.